(12) United States Patent
Kang (10) Patent No.: US 11,036,664 B2
(45) Date of Patent: Jun. 15, 2021

(54) METHOD FOR DETERMINING THE TRANSMISSION SPEED OF A COMMUNICATION MODULE IN ADAPTING A CONNECTED COMMUNICATION MODULE TO A BUS AND A DEVICE FOR SAID METHOD

(71) Applicant: VSI CORPORATION, Seoul (KR)

(72) Inventor: Su Won Kang, Seoul (KR)

(73) Assignee: VSI CORPORATION, Seoul (KR)

( * ) Notice: Subject to any disclaimer, the term of this patent is extended or adjusted under 35 U.S.C. 154(b) by 0 days.

(21) Appl. No.: 16/689,609

(22) Filed: Nov. 20, 2019

(65) Prior Publication Data

US 2020/0327085 A1 Oct. 15, 2020

(30) Foreign Application Priority Data

Apr. 9, 2019 (KR) .......................... 10-2019-0041641

(51) Int. Cl.
| | | |
|---|---|---|
| *G06F 13/40* | (2006.01) | |
| *G06F 11/07* | (2006.01) | |
| *G06F 11/10* | (2006.01) | |
| *G06F 13/374* | (2006.01) | |
| *H04L 12/40* | (2006.01) | |
| *G06F 13/38* | (2006.01) | |

(52) U.S. Cl.
CPC ........ *G06F 13/4059* (2013.01); *G06F 11/076* (2013.01); *G06F 11/1004* (2013.01); *G06F 13/374* (2013.01); *H04L 12/40013* (2013.01); *H04L 12/4013* (2013.01); *H04L 2012/40215* (2013.01)

(58) Field of Classification Search
CPC .............. G06F 13/4059; G06F 11/076; G06F 11/1004; G06F 13/374; G06F 13/385; H04L 12/40013; H04L 12/4013; H04L 2012/40215; H04L 12/40097; H04L 12/40032; H04L 12/40182; H04L 12/40071; H04L 2012/40273
See application file for complete search history.

(56) References Cited

U.S. PATENT DOCUMENTS

| | | | | |
|---|---|---|---|---|
| 5,787,132 A | * | 7/1998 | Kishigami | .............. H04L 7/042 370/304 |
| 5,914,954 A | * | 6/1999 | Nakayama | ............ H04L 49/108 370/252 |

(Continued)

*Primary Examiner* — Idriss N Alrobaye
*Assistant Examiner* — Henry W Yu
(74) *Attorney, Agent, or Firm* — Hauptman Ham, LLP (57) ABSTRACT

A device of the present invention, connected to a Communication Module (CM) via two signal lines, constructs a frame, formatted according to a second Communication Protocol (CP), from bit signals, which are being received from the CM via one signal line, corresponding to data of a frame of a particular format defined by a first CP, to transmit the constructed frame to a bus while transmitting data detected from the bus to the CM via the other signal line in the form of a frame of the particular format. The device measures a width of a pulse signal inserted at a predetermined position in a frame of the particular format being received from the CM first after power on, identifies a bit rate, based on the measured width, at which the CM transceiver data, and applies the identified bit rate to data communication with the CM.

14 Claims, 6 Drawing Sheets

(56) References Cited

U.S. PATENT DOCUMENTS

| | | | | |
|---|---|---|---|---|
| 9,054,851 B2* | 6/2015 | Bowling | ............... | H04L 7/0331 |
| 2007/0165678 A1* | 7/2007 | Huertgen | ................ | H04L 7/005 |
| | | | | 370/516 |
| 2013/0290580 A1* | 10/2013 | Hartwich | ............ | H04L 12/4013 |
| | | | | 710/105 |
| 2014/0375312 A1* | 12/2014 | Friedrich | ................ | G01P 3/487 |
| | | | | 324/259 |
| 2015/0193373 A1* | 7/2015 | Ngo | .................... | G06F 13/4291 |
| | | | | 710/110 |

* cited by examiner

METHOD FOR DETERMINING THE TRANSMISSION SPEED OF A COMMUNICATION MODULE IN ADAPTING A CONNECTED COMMUNICATION MODULE TO A BUS AND A DEVICE FOR SAID METHOD

CROSS REFERENCE TO RELATED APPLICATION

This application claims the priority of Korean Application No. 10-2019-0041641, filed on Apr. 9, 2019. The entire disclosure of the above application is incorporated herein by reference.

BACKGROUND

Field

The present invention relates to method and device for mediating the connection of communication modules of various functions, each of which corresponds to a node on a bus, to a shared bus.

Description of the Related Art

Many kinds of apparatuses that make life easier for persons have a wide variety of functions, and in case of a complex apparatus among them, especially a vehicle requires a lot of information to be communicated in real time among a variety of Electronic Control Units (ECUs). Such information exchange in a vehicle or the like is mainly performed through a specific type of communication network, for example, a Controller Area Network (CAN).

A specialized communication network such as CAN employed in a vehicle and the like is used for communication of driving conditions and diagnosis results of car, states of safety and convenience equipment, and control signals to an engine and a transmissions for driving control.

Figure 1:
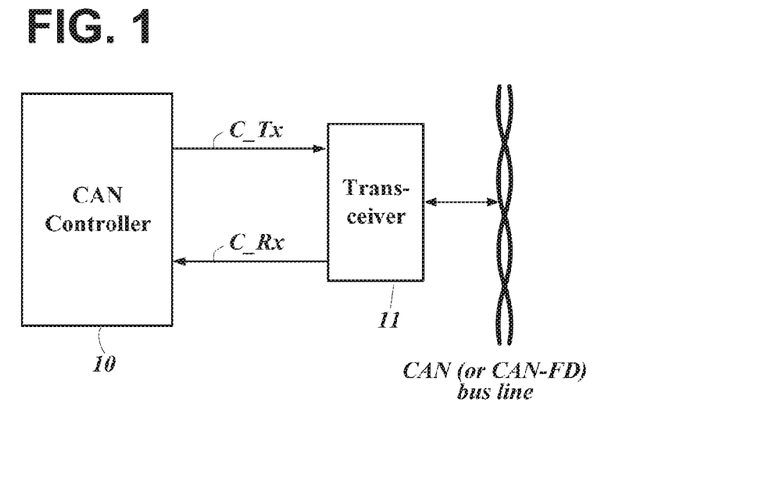
FIG. 1 shows only a configuration that is connected to the CAN bus, etc. in an existing ECU.

As illustrated in FIG. 1, an ECU supporting CAN includes, in order to communicate data on the basis of CAN, a CAN controller 10 being capable of transmitting and receiving data in compliance with CAN, and a transceiver 11 for transceiving signals through a CAN bus line. Nodes such as ECUs connected to the CAN bus communicate at a bit rate fixed within the range of hundreds of kbps to 1 Mbps. In case of a bus to which CAN with Flexible Data-Rate (CAN-FD) communication protocol, more advanced than CAN, is applied, nodes connected thereto can use a bit rate in the range of hundreds of kbps to 2 Mbps. Therefore, if the CAN (or CAN-FD) bus is configured at a specific speed within the aforementioned range, the transmission line C_Tx and the receiving line C_Rx connected between the CAN controller 10 and the transceiver 11 carry data bits based on the clock of the configured specific speed.

Nowadays, in addition to the above-mentioned types of data relating states and operation of a vehicle, various types of data are generated within a vehicle. For example, an AV device installed in a vehicle may play multimedia contents stored in a storage device, a navigation device may receive TPEG data and display it on a screen. Furthermore, data resulting from continuously photographing a road ahead or lanes of a road on which the vehicle is traveling are generated by an improved driving convenience function of a vehicle, e.g., an auto cruise function and the like.

As such, a significantly greater amount of data is generated in a vehicle than before, and these new types of data need to be also shared among the ECUs by communication or transmitted over a communication network to a terminal that processes the data. However, the interface for the CAN communication illustrated in FIG. 1, which is universally applied to the current vehicles, is not fast enough to accommodate these new kinds of data.

According to the communication protocol defined in CAN or CAN-FD, the CAN controller 10 cannot transmit data bits through the transmission line C_Tx while receiving data bits from the transceiver 11, and every signal carried on the CAN bus is detected by the transceiver 11 and is then transmitted as data bits to the CAN controller 10 via the receiving line C_Rx.

Therefore, in a bus arbitration based on a unique identifier (ID), a CAN controller of a node having a low priority has a chance to transmit data at a preset speed through a transmission line in inverse proportion to the degree of occupancy of the receiving line C_Rx. This situation stands out more as the number of nodes connected in common to one CAN bus increases.

This situation can be solved by building a separated new CAN bus and distributing the nodes to different CAN buses. However, this increases the number of components required for vehicle manufacturing, which leads to additional burdens (such as parts management and increase of assembly processes, etc.) on a vehicle manufacturer.

For the reasons described above, manufacturers of vehicles, etc. want to install a communication network of a higher speed in a vehicle and the like. In order to apply a bus of the new communication system, all of the CAN controller chips of the ECUs must be replaced with the communication chips according to the new communication system. However, developing or adopting a new component that can transmit and receive data based on higher speed clock, to replace a component that is already stable and reliable in performance, may be reluctant from the point of view of a manufacturer that must consider the time, cost, and unpredictable quality of transmission signals and the like.

Therefore, it may be desirable to allow CAN controller chips, which operate in compliance with existing CAN or CAN-FD protocol, to use a higher speed bus while still using those chips. To do this, there is a need for a device that intervenes between such a CAN controller chip and a shared bus, which new communication system of higher speed is applied to, and allows the CAN controller chip to take advantage of the service speeds provided by the new bus of higher speed even though the CAN controller chip behaves as if it is connected to a conventional bus.

In addition, in order to apply a device for mediating a connection to a new bus being capable of providing faster speeds than the speed at which the CAN controller transmits data, it is necessary to know exactly what speed the existing CAN controller chip of which connection to the shared bus is to be mediated transmits data at. By doing so, data transmitted from the CAN controller chip can be received without error and then transmitted to the new higher-speed bus so that other nodes can receive it. The same applies to data transfer in the reverse direction.

SUMMARY OF THE INVENTION

It is an object of the present invention to provide device and method for mediating connection of communication modules to a bus so that they can use speed provided by a new bus even if they communicate in compliance with the existing protocol.

It is another object of the present invention to provide device and method for identifying any bit rate at which a communication module transmits and receives data in order to mediate connection of the communication module to a shared bus.

The scope of the present invention is not necessarily limited to the above explicit statements. Rather, the scope of the present invention covers anything to accomplish effects that could be derived from the specific and illustrative explanations of the present invention below.

A device for mediating connection of a Communication Module (CM) to a bus in order for the CM to use a bus according to one aspect of the present invention, comprises: an interface unit configured to be connected to the CM via a first signal line and a second signal line that are separated from each other, and to receive and transmit bit signals through the first and second signal lines, respectively; a first buffer configured to store data of a frame of an particular format constituted by a bit stream received from the CM by the interface unit via the first signal line, the particular format being defined by a first Communication Protocol (CP); and a link control unit configured to be connected to the bus, to incorporate data stored in the first buffer into a frame of an arbitrary format defined by a second CP, to transmit the frame of the arbitrary format through the bus, and to store data, which pertains to a frame of the arbitrary format detected from signals carried on the bus, in a second buffer. And, the interface unit transmits data stored in the second buffer in form of a frame of the particular format to the CM via the second signal line; measures a width of a pulse signal inserted at a predetermined position in a first frame of the particular format being received first from the CM via the first signal line; identifies a bit rate, based on the measured width, at which the CM transceives data, and applies the identified bit rate to data communication with the CM.

In one embodiment according to the present invention, the pulse signal may correspond to one bit in the first frame.

In one embodiment according to the present invention, the predetermined position may be located at a point where the first frame starts.

In one embodiment according to the present invention, the interface unit additionally identifies a second bit rate, which the CM uses in transceiving data, based on a width measured for a second pulse signal inserted, after the pulse signal, at a predetermined position in the first frame, and then applies the identified second bit rate to data communication with the CM too. In this case, the second pulse signal has a narrower interval than the pulse signal in the first frame. In the present embodiment, the second pulse signal is prepared at a position where a section of which bit rate changes in the first frame starts, or at another position where a field including information on length of data carried in the first frame starts.

In one embodiment according to the present invention, the interface unit obtains a bit sequence from signals corresponding to the first frame based on the identified bit rate; determines whether or not there is a reception error, based on a value of a CRC sequence included in a frame constituted by the obtained bit sequence; and applies the identified bit rate to data communication with the CM module only when it is confirmed that there is no reception error. In this embodiment, while driving the second signal line so that a bit stream, which is being received via the first signal line, appears in the second signal line, the interface unit drives the second signal line so that a value, which indicates a result of the determination as to whether or not there is a reception error, appears in an interval of response signal determined for the first frame by the particular format.

In another embodiment according to the present invention, the pulse signal may be an interval corresponding to two or more bits in the first frame.

A method for mediating a connection of a CM intended for communication based on a first CP to a bus, which data is communicated through based on a second CP other than the first CP, according to another aspect of the present invention, comprises: a first step, conducted by the CM, of constructing a first frame of a particular format, which is defined by the first CP, in such a manner that level is to be changed right before and after a bit interval at predetermined position in the first frame, when power is supplied to the CM, and of transmitting the constructed frame to an adapting device via a first signal line; a second step, conducted by the adapting device, of measuring a width of a pulse signal located at a predetermined position in the first frame, if the first frame is first received via the first signal line from the CM after power is supplied to the adapting device, and of identifying a bit rate, which the CM transceives data at, based on the measured width; and a third step, conducted by the adapting device, of applying the identified bit rate to both obtaining a bit stream of a frame from signals to be transmitted later via the first signal line by the CM and transmitting data of a frame in form of bit stream to the CM via a second signal line.

In one embodiment according to the present invention, the second step further comprises an additional step of obtaining a bit stream, based on the identified bit rate, from signals corresponding to the first frame, and of checking whether or not there is a reception error in a frame constituted by the obtained bit stream, based on a value of a CRC sequence contained in the constituted frame. In this embodiment, the third step is conducted only when a result of the checking indicates that there is no reception error. In addition, the additional step may further comprise a sub-step of driving the second signal line so that a specific value indicating the result of the checking is transmitted to the CM and the method may further comprise: a step, conducted by the CM when the specific value indicates an error in reception, of constructing a second frame of the particular format in such a manner that level is to be changed right before and after the bit interval in the second frame, and of transmitting the second frame to the adapting device via the first signal line; and a step, conducted by the CM when the specific value indicates successful reception, of configuring data, which is generated and transmitted by at least one second device connected to the CM, into a new frame of the particular format, and of transmitting the new frame to the adapting device via the first signal line. In this case, the second frame may be constructed such that at least a part of bit pattern is different from the first frame in a section other than the bit interval.

In the device, method and various embodiments described above, the first CP may be CAN or CAN-FD protocol.

In accordance with the present invention described above or at least one embodiment of the present invention to be described in detail below with reference to appended drawings, a method for identifying transmission speed of a connected communication module, of which connection to a shared bus is to be mediated, automatically finds out the data transmission speed of an ECU, mounted on a vehicle etc., which is supposed to be connected to an existing bus such as CAN or CAN-FD and communicate according to that communication protocol, and conducts data transmission and reception with the ECU at the found speed without any error. Accordingly, the data to be transmitted and received is ultimately delivered to other ECUs at the higher bit rate served by the new bus, and also data from them is received through the new bus and transferred to the ECU at the found speed.

As a result, it is very easy to make the existing communication modules having various bit rates use the higher speed bus without tedious works of individually setting the corresponding bit rate to devices which respectively mediate connection of the communication modules to the higher speed bus. This simplifies the manufacturing process of equipment mounted with a bus system consisting of such communication modules, and can reduce the time and cost required to manufacture the equipment.

DETAILED DESCRIPTION

In what follows, embodiments of the present invention will be described in detail with reference to appended drawings.

In the following description of the embodiments of the present invention and the accompanying drawings, the same reference numerals or symbols designate the same elements unless otherwise specified. Of course, for convenience of explanation and for the sake of understanding, the same components may be indicated by different reference numbers or symbols if necessary.

Figure 2:
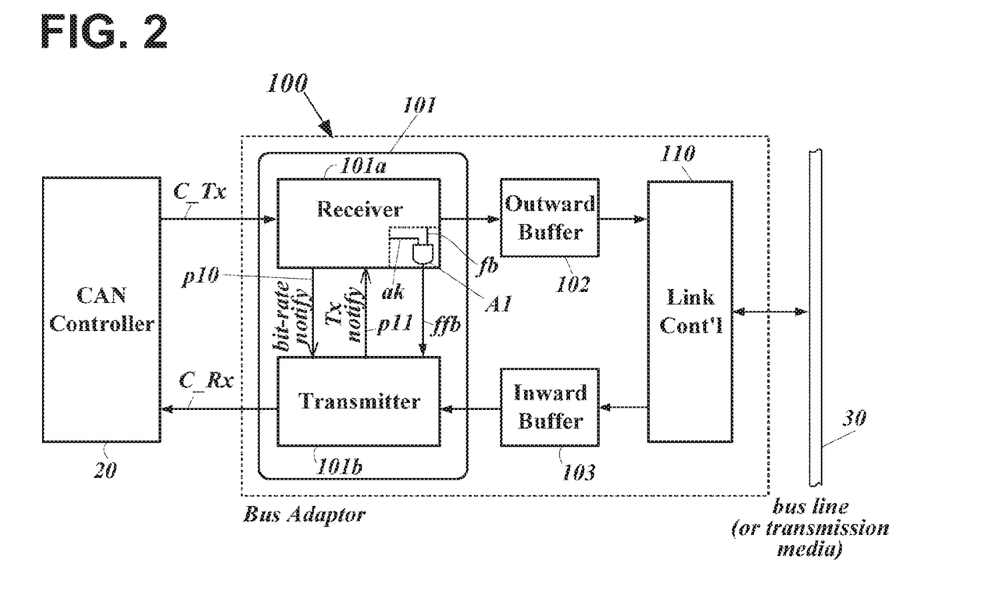
FIG. 2 illustrates a configuration of a device in which a method of identifying transmission speed of a communication module of which connection to a bus is to be mediated is embedded, together with its peripheral configuration, according to an embodiment of the present invention.

FIG. 2 illustrates a configuration of a device in which a method of identifying transmission speed of a Communication Module (CM) of which connection to a shared bus is to be mediated is embedded, together with its peripheral configuration, according to an embodiment of the present invention;

The device 100 illustrated in FIG. 2 according to the present invention allows the CAN controller 20, which is intended to communicate in compliance with CAN protocol, one of conventional Communication Protocols (CPs), to be capable of communicating via the high-speed data bus replacing a CAN bus while conforming to the conventional CP. In this specification, the device 100 for mediation is referred to as a 'bus adapter'.

To be sure, the bus adapter 100 can also mediate the connection of a CM, which conforms to CAN-FD providing higher speed compared to CAN, to the data bus 30 of high speed to which new CP is applied. The bus adapter 100, in mediating the connection of a CM communicating based on CAN-FD to the bus 30, operates in the same way as when a CM communicating in accordance with CAN is connected thereto, except for the operations, which will be described in detail later, of identifying the transmission speed (more specifically, dual transmission speeds) of a CM connected thereto. Thus, after the operations of identifying the transmission speed of a connected CM communicating based on CAN, which are necessary for the bus adapter 100 to mediate the CAN-based controller 20 to the bus, are described first, the speed identifying operations in the case of a CAN-FD-based controller are explained.

The bus adapter 100 comprises: a CAN interface 101 for transmitting and receiving bit signals to and from a CAN controller 20, which is a CM communicating in compliance with CAN, through a transmission line C_Tx and a receiving line C_Rx separated from each other; an outward buffer 102 in which bit streams received by the CAN interface 101 are stored in units of frames, each of which is formatted as specified by CAN (this frame is abbreviated as 'CAN frame'); an inward buffer 103 in which data received from other nodes on a shared bus is stored in units of CAN frames; and a link controller 110, connected physically to a high-speed (for example, several Mbps or tens of Mbps) bus 30 that is faster than the existing CAN bus (or CAN-FD bus), for incorporating CAN frames stored in the outward buffer 102 into frames, each of which is formatted in compliance with a new CP of the high-speed bus 30, and transmitting the frames toward other nodes on the high-speed bus while detecting data on the high-speed bus 30 and storing the data in the inward buffer 103 in the units of CAN frames.

The CAN interface 101 includes a receiving unit 101a for receiving the bit signals transmitted by the CAN controller 20 through the transmission line C_Tx and a transmitting unit 101b for transmitting the CAN frames stored in the inward buffer 103 to the external CAN controller 20 through the receiving line C_Rx.

As mentioned above, the bus adapter 100 can mediate the connection to the high-speed bus 30 for a CM communicating in compliance with CAN-FD that supports an improved transmission speed than CAN. In this case, the CAN interface 101 is replaced with a CAN-FD interface that detects bit streams from signals on the transmission line C_Tx and transmits data in form of bit signals through the receiving line C_Rx in accordance with CAN-FD protocol. Accordingly, the frames configured according to CAN-FD protocol are temporarily stored in the outward buffer 102 and the inward buffer 103.

Although the bus adapter 100 eventually makes a higher speed bus of a CP different from CAN or CAN-FD protocol be used for data communication between the nodes, it conducts operations to cause the high-speed bus to appear to the external CAN controller 20 (or CAN-FD-based CM) as a bus supporting signal transceiving in accordance with CAN (or CAN-FD).

As the high-speed bus 30 to which the bus adapter 100 is physically connected, any bus, for example, the higher-speed Ethernet or other types of higher-speed buses known or to be developed sooner or later, that has proven to be stable and reliable with a higher transfer rate than the CAN or CAN-FD bus is applicable. In this case, the link controller 110 transmits/receives signals in accordance with the CP of the adopted bus when communicating with a physically connected bus.

The principle and technical idea of the present invention is to automatically find out the bit rate applied to a CM in the range of bit rates supported by the conventional CP when mediating the connection of the CM to a bus so that the CM communicating based on the conventional CP uses the bus that serves a higher speed than a conventional bus to be used for communication between CMs communicating based on the conventional CP. In order for the principle and the technical idea of the present invention to be understood in more detail, by taking a CM communicating in CAN or CAN-FD as an example, it will be described how the bus adapter 100 identifies the data transmission rate of a connected CM. Therefore, if there is a certain CP to which the principles and concept of finding out the data transmission rate of the connected CM, which will be described in detail below, can be applied as it is, the scope of the present invention should be construed to extend to an embodiment in which the transmission rate of a CM communicating based on such a CP is found out for mediating its connection to a new bus unless the claims that claim the rights of the invention expressly exclude such a CP.

Figure 3:
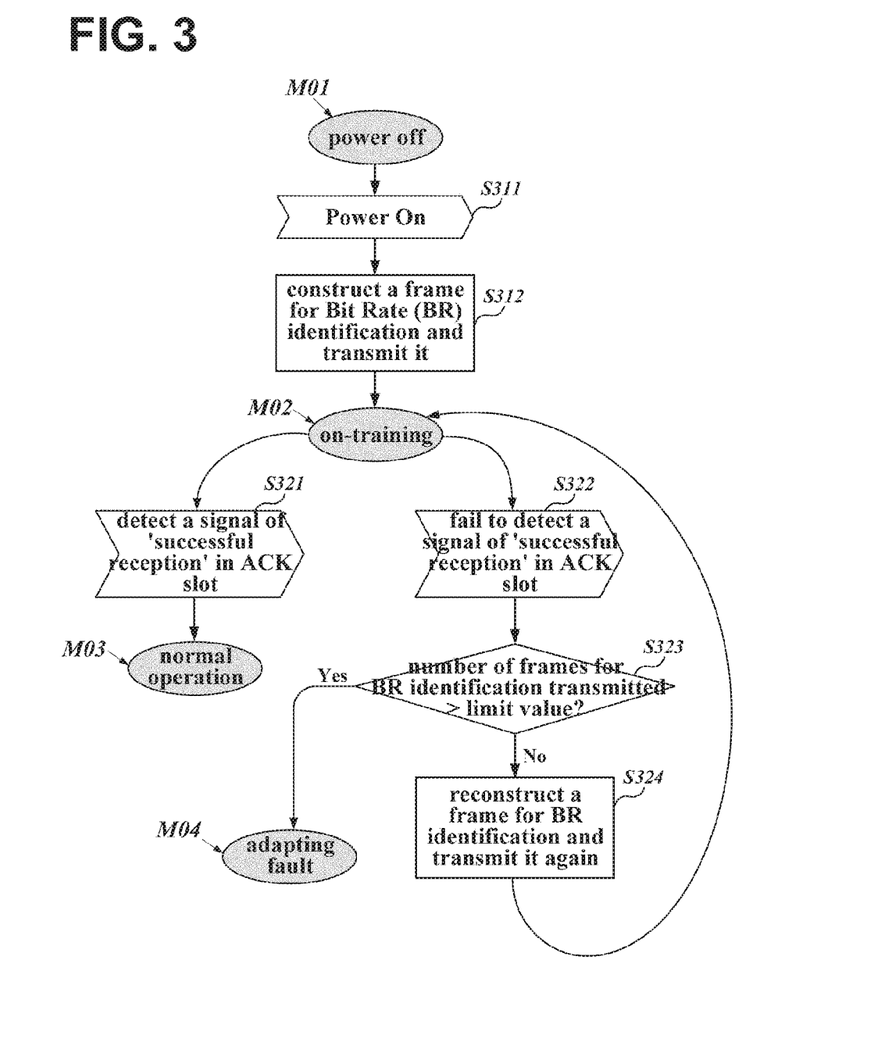
FIG. 3 is a state diagram related to operations of a communication module of which connection to a bus is mediated by the bus adapter shown in FIG. 2, according to an embodiment of the present invention.
Figure 4:
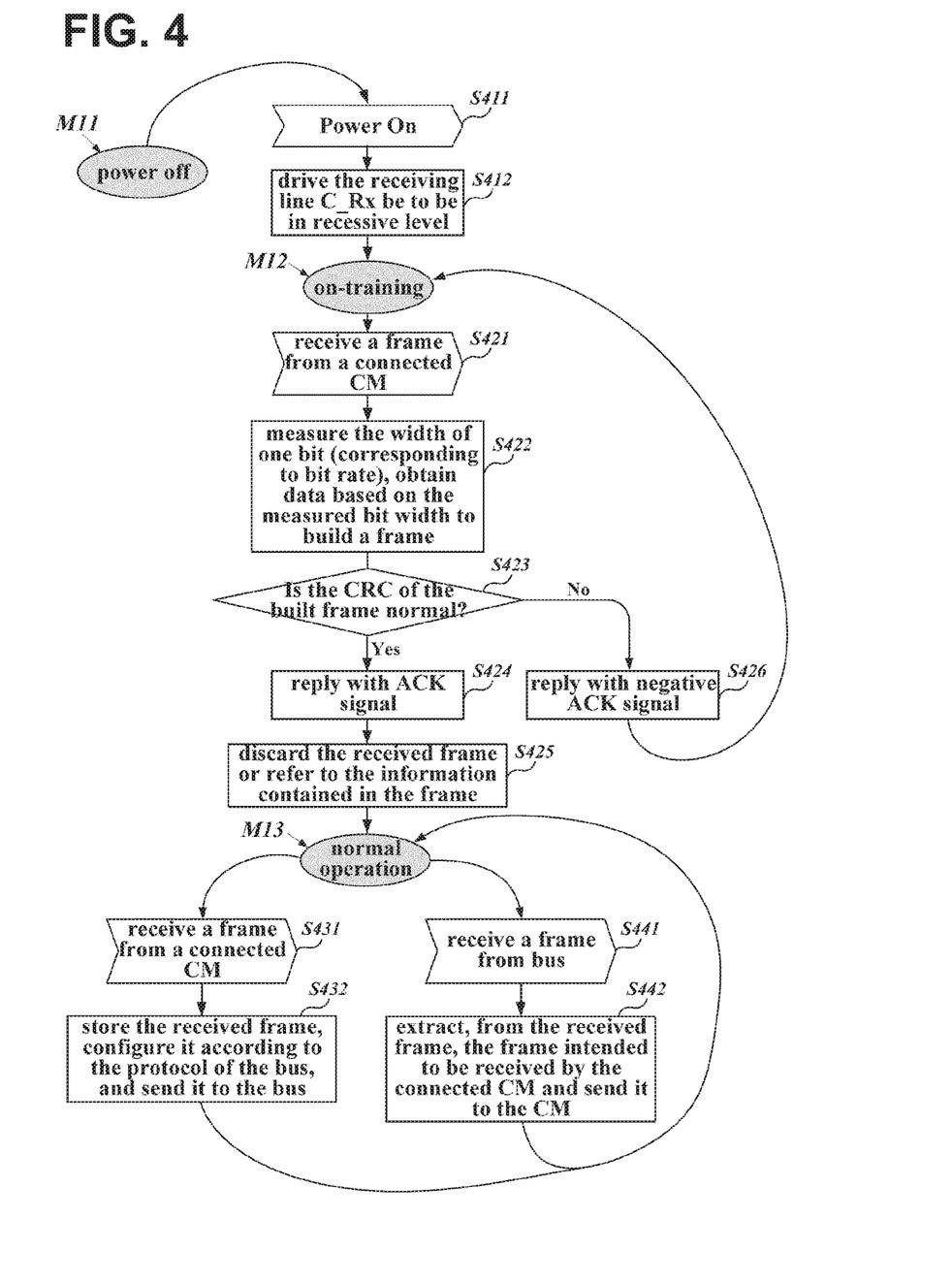
FIG. 4 is a state diagram related to operations of the bus adapter shown in FIG. 2 that mediates the connection of a connected communication module to a bus according to an embodiment of the present invention.

FIG. 3 is a state transition diagram relating to the operations of a CM, namely, the CAN controller 20 of which the connection to the bus is mediated by the bus adapter 100, according to an embodiment of the present invention, and FIG. 4 is a state transition diagram relating to the operations of the bus adapter 100 that mediates the connection of a CM connected thereto to the bus according to an embodiment of the present invention. Hereinafter, various methods of identifying the transmission speed of a CM to which the bus adapter 100 is connected in order to mediate the connection of the CM to the bus will be explained in detail with reference to FIGS. 3 and 4.

The operations according to the state transition diagram of the embodiment of FIG. 3 may be performed by an existing CAN controller chip without changing or re-designing its hardware if its firmware etc. to be loaded into and executed when power is supplied is supplemented or updated.

Figure 5:
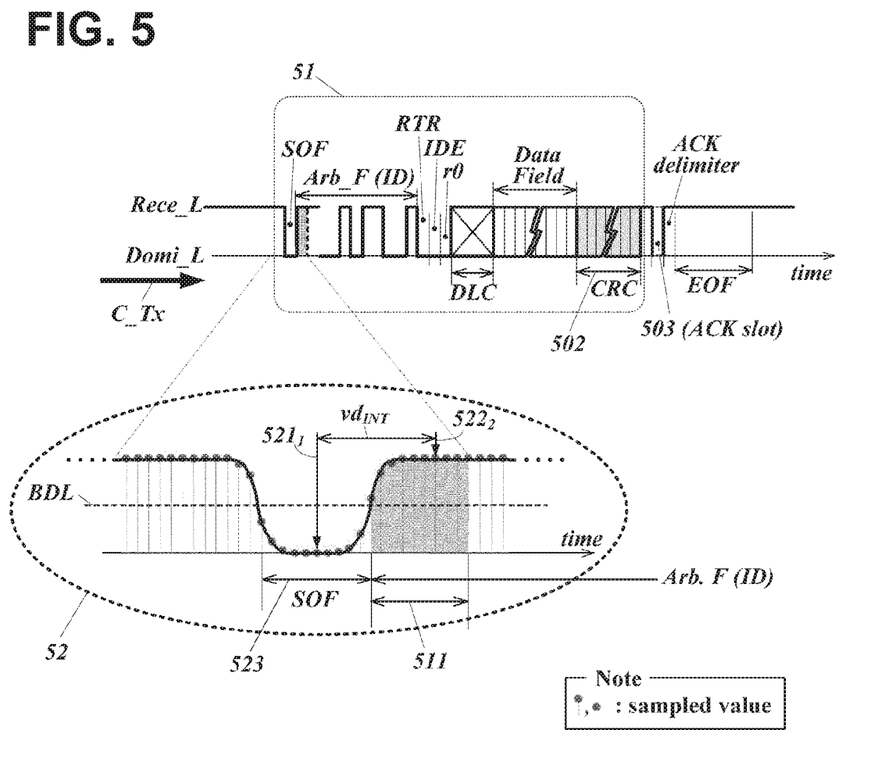
FIG. 5 is a diagram illustrating a process in which the bus adapter of FIG. 2 finds out the data transmission speed of a connected communication module from a frame transmitted by the communication module according to a conventional communication protocol, according to an embodiment of the present invention.

When the CAN controller 20 that is a CM of which the connection to the bus is mediated by the bus adapter 100 is supplied with power in a power-off mode M01 (S311), as illustrated in FIG. 5, it constructs a frame for bit rate identification (this frame is called as 'BRI frame', hereinafter) 51 and then sequentially transmits the bits of the constructed BM frame, starting from the frame start bit SOF, to the transmission line C_Tx at a speed preset therein (S312). And, the number, i.e., one indicating how many times the BRI frame has been transmitted is recorded.

The CAN controller 20 conforming to CAN protocol can start transmission only when a bit pattern of seven consecutive bits of logical 1, defined as 'frame end', is detected on a bus for communication Therefore, when power is supplied to the bus adapter 100 (S411) and the CAN controller 20 in the power-off state M11 at the same time, the transmitting unit 101b of the CAN interface 101 in the bus adapter 100 drives the receiving line C_Rx, which appears to be a signal line of a shared bus from the standpoint of the CAN controller 20, to be in a recessive level state (S412) in order to allow the CAN controller 20 to transmit a BRI frame initially.

Of course the transmitting unit 101b keeps the receiving line C_Rx in a recessive level. while there is no CAN frame in the inward buffer 103 to be transmitted to the external CAN controller 20.

The recessive level is defined for a level appearing on a bus where transmission and reception of signals are simultaneously used via a single line (here, a single line refers to a related signal line under the condition that one line used as a reference of a signal is excluded from the physical signal lines constituting the bus), as in the CAN (or CAN-FD) communication system. The recessive level refers to a level opposite to a dominant level. When both levels are simultaneously asserted on a single signal line, a dominant level appears on the signal line. In the CAN (or CAN-FD) communication system, because the recessive level is a level that appears on the signal line when there is no electrical drive (such bus signal line asserting according to the logic value is performed by a conventional CAN transceiver 11), the dominant level naturally appears on the signal line, i.e., the bus when the signal line is driven with a logic value corresponding to the dominant level. Normally, the dominant level corresponds to the value of logic 0, and the recessive level corresponds to the value of logic 1, and therefore, the description in this specification is based on the assumption of such a relationship between level and logical value.

However, unlike the conventional case where the CAN controller is connected to the bus via a conventional CAN transceiver, in the case that the CAN controller is connected indirectly to the bus via the bus adapter 100 intervening therebetween as in the present invention, the CAN interface 101, which is connected to the CAN controller 20 that drives the transmission line C_Tx with respect to the logic 1 and 0, also drives the receiving line C_Rx for the logic 1 and 0 respectively to transmit digital signals to the counterpart. Previously, the state of logic 1, which is made on a single line when it is not driven by electrical signal to allow the collision of logic 1 and 0, was called a recessive level. However, in this specification, in order to apply the same terminology to the signal states defined by CAN or CAN-FD for the frame bits transmitted between the CAN controller 20 and the bus adapter 100, the state of logic 1 is also called as a recessive level although the signal lines C_Tx and C_Rx are electrically driven even in case of logic 1.

When the power is supplied, the bus adapter 100 enters the on-training mode M12 after the transmitting 101b drives the receiving line C_Rx to be in a recessive level state, that is, after driving the receiving line C_Rx with a logic 1 value.

The BRI frame to be transmitted by the CAN controller 20 for the first time after the power is supplied is constructed according to the following two rules.

The first rule is that a BRI frame must have a value of one bit (this bit is called a 'BRI bit' in this specification) corresponding to a pulse of which level is changed right before and after a particular position (information about this position is already known to the bus adapter 100.) determined from the specific signal SOF indicating start of a frame. That is, if a bit value at the particular position is 0, there should be a recessive level right before and after the value 0 (In this case, the BRI bit corresponds to a signal in the form of a negative pulse.). If a bit value is 1, there should be a dominant level right before and after the value 1 (In this case, the BRI bit corresponds to a positive pulse.).

In one embodiment according to the present invention, the frame start bit SOF is used as the BRI bit because the bit SOF indicating the start of a frame always changes from the recessive level to the dominant level (bit value 0). In order to use the frame start bit as the BRI bit, transition to the recessive level (bit value 1) must be made at the start of the arbitration field following the frame start bit. Therefore, when the CAN controller 20 constructs the BRI frame, it configures the first value 511 in the arbitration field constituting the BRI frame to be a recessive level. Such a configuration for the arbitration field constituting the BRI frame is the same even if the first value of the unique identifier (ID), which is used for bus arbitration Arb_F, assigned to the CAN controller 20 is zero.

In another embodiment according to the present invention, the BRI bit may be applied to another position of the frame without using the frame start bit SOF as the BRI bit. However, if the BRI bit is applied to a position other than where the frame begins, the bus adapter 100 must measure the minimum bit width from the BRI bit according to the method described later and recover a bit string inversely for the signals preceding the BRI bit. As a result, the bit recovery process of a frame becomes somewhat complicated, and some bits are not recognized in real time. The BRI frame is used initially in order that the transmission bit rate, that is, the minimum bit width, of a connected CM is identified, and after the minimum bit width is identified, the bit stream of any CAN frame transmitted by the connected CM can be recognized real-time. Therefore, ignoring the difference in the initial operation for measuring the minimum bit width when being compared to the case where the BRI bit is located at the start position of the BRI frame, the BRI bit to be used for bit-rate identification may be designated anywhere in the BRI frame.

The second rule to be observed when constructing a BRI frame is to obtain a Cyclic Redundancy Check (CRC) sequence 512 for a bit stream to be carried in a BRI frame and add it to the BRI frame, as in constructing a general CAN frame.

As described above, the BRI frame is used to identify the data bit rate (namely, the minimum bit width) at which a connected CM transmits data bits, so that data carried in the data field of the frame may be meaningless. That is, after the bus adapter 100 receiving the BRI frame finds out the transmission speed of the connected CM 20 from the BRI frame according to the method described below, the BRI frame may be discarded. Accordingly, the BRI frame may be configured by setting the length of the data field to zero (i.e., DLC field="0000").

However, in another embodiment according to the present invention, when the BRI frame is constructed, it may be configured such that the information necessary for the bus adapter 100 is included in data field thereof. For example, the CAN controller 20 may insert a value indicating a bit rate, i.e., its transmission speed (for example, 500 [kbps], 1,000 [kbps], etc) in the data field of the BRI frame. In this case, the bus adapter 100 measures the minimum bit width from the BRI frame according to the method described below and may compare bit rate corresponding to the measured minimum bit width with the value of bit rate carried in the data field of the frame in order to verify the accuracy of the bit rate identified by itself.

The CAN controller 20 constructs a BRI frame as described above, and drives the transmission line C_Tx depending on the corresponding bit string to transmit data of the constructed BRI frame, and then enters the on-training mode M02.

On the other hand, the receiving unit 101a of the CAN interface 101 samples the signal state of the transmission line C_Tx at a predetermined sampling frequency. In the on-training mode M12, the receiving unit 101a measures, in the following manner including the process of signal sampling, the minimum bit width revealing the bit rate to be used for bit recovery from the signals carried on the transmission line C_Tx.

In the on-training mode M12, when a bit string of the frame 51 configured as illustrated in FIG. 5 begins to be received through the transmission line C_Tx (S421), the receiving unit 101a identifies, from the BRI bit at a position on the BRI frame promised to each other with the connected CAN controller 20, the data transfer rate (which is sometimes called bit rate or transmission speed) of the connected CAN controller 20 while sampling signals (52) corresponding to the frame 51. In other words, according to the above-described preferred embodiment, the bit rate of the frame is identified based on the number of samples for the start bit SOF (i.e., the BRI bit) whose level is first changed from the recessive to the dominant on the transmission line C_Tx.

The receiving unit 101a, while sampling the signal state of the transmission line C_Tx, measures the minimum bit width from the number of values sampled for the BRI bit {That is, values lower than the set reference level BDL (when a value of 0 corresponding to the dominant level is applied to the BRI bit) among the sampled values} and Obtains a series of bits sequentially, based on the measured minimum bit width, from the signals on the transmission line C_Tx to complete a frame, i.e., the BRI frame (S422).

In more detail, while skipping, starting from the sampled value $521_1$ corresponding to the center of the sampled values belonging to the width 523 of the BRI bit (which is an interval from a position where a sampled value regarded firstly as the dominant level to another position where a sampled value regarded as the recessive level on the basis of the reference level BDL), by the interval $vd_{INT}$ (referred to as 'Bit Acquisition Interval (BAI)' hereinafter) corresponding to the number (eleven in the example in the figure) of sampled values belonging to the interval 523, the sampled values are taken one by one ($522_i$, i=2, 3, . . . ) every BAI to obtain a bit string for the frame.

While the receiving unit 101a performs an operation of acquiring the bit string of a frame while sampling the signals carried on the transmission line C_Tx as explained before, the level of signals carried on the transmission line C_Tx is triggered to feed back (fb) to the transmitting unit 101b as digital signals. The digital signals fed back (fb) are logically ANDed with the acknowledgment signal (ak) to be explained later by an internal AND gate A1, and then finally transmitted to the transmitting unit 101b (ffb). The acknowledgment signal (ak) is a signal to be outputted as a logic 0 by the receiving unit 101a when it is confirmed that a frame is successfully received and is always held at a value of a logic 1 except for such confirmation. While the logic 1 is maintained, digital signals of 0s and 1s being fed back (fb) explained before are finally inputted to the transmitting unit 101b (ffb).

The transmitting unit 101b drives the receiving line C_Rx in accordance with a series of bits being fed back from the receiving unit 101a to copy the bit string 51 of the BRI frame being received currently through the transmission line C_Tx onto the receiving line C_Rx.

At this time, since the digital signals carried on the transmission line C_Tx are copied as they are onto the receiving line C_Rx as digital signals, it is not necessary to be in a state where the transmitting unit 101b knows the data transfer rate of the connected CAN controller 20.

The digital signals transferred from the receiving 101a to the transmitter 101b (fib) are not always copied onto the receiver line C_Tx. Whether to send the digital signals fed back (ffb) by the receiving unit 101a to the receiving line C_Rx may be determined by the transmitting unit 101b. This will be described later.

The reason why the CAN interface 101 transfers the bit string of a frame being received through the transmission line C_Tx to the receiving line C_Rx is that the CAN controller 20 is configured to continuously transmit the data bits corresponding to an arbitrary CAN frame following the unique ID only when the bits appearing on the receiving line C_Rx are identical to the bit pattern corresponding to the unique ID transmitted by itself.

On the other hand, after the receiving unit 101a builds the BRI frame with the bit string obtained in the above-described manner from the signals carried on the transmission line C_Tx, it determines the CRC code in a predetermined manner with respect to the bit string of the built frame (except the CRC field). The determined CRC code is then compared with the CRC sequence 512 contained in the built frame to check whether there is an error in the built frame (S423).

Since the data transfer rate, namely, the bit rate, of the connected CAN controller 20 is correctly identified if there is no error in the built frame, the receiving unit 101a applies, to the AND gate A1 (ak) with respect to the BRI frame, an ACK (acknowledgment) signal, i.e., logic 0 indicating 'successful reception' at a time point of an ACK slot 503, which is an interval as small as the minimum bit width determined from the identified bit rate, prepared in the bit stream of the BRI frame according to the identified bit rate. Accordingly, regardless of the digital signals applied on the feedback path (fb), the signal inputted to the transmitter 101b (ffb) becomes logical zero. As a result, the dominant level logic 0, which is an acknowledgment, appears in the ACK slot 503 in the bit string of the frame being copied onto the receiving line C_Rx (S424).

When it is confirmed that the transmission speed of the connected CAN controller 20 is correctly found out, the receiving unit 101a notifies the transmitting unit 101b of a value indicating the identified bit rate (p10) to be set therein. If there is such a setting, the transmitter 101b will drive the receiving line C_Rx in accordance with a series of bits at the set bit rate with respect to a frame to be transmitted to the CAN controller 20 later. Thus, a series of bits constituting a frame will be sequentially transmitted at a speed synchronized with the transmission speed of the connected CAN controller 20.

On the other hand, when it is confirmed that there is no error in the built frame, the receiving unit 101a uses the necessary information if it is contained in the data field of the built frame as mentioned above (S425). Then, the frame built from the bit string received in the on-training mode M12 is discarded so as not to be transmitted to the high-speed bus by the link controller 110.

After causing the transmitting unit 101b to transmit an ACK signal indicating 'successful reception' at the time of the ACK slot 503 through the receiving line C_Rx, the bus adapter 100 enters the normal operation mode M13.

If checking of the CRC sequence 512 results in an error of the built frame as an error, the receiving unit 101a applies a NACK (Negative Acknowledgment) signal, namely, a logic 1 indicating a 'faulty reception' to the AND gate A1 at the time of the ACK slot 503. At this point, the signal received via the transmission line C_Tx, while being fed back to the feedback path (fb), is also logic 1 from the ACK slot 503, and the signal finally applied to the transmitting unit 101b (ffb) becomes a logic 1. As a result, in the bit stream of the frame being copied by the transmitting unit 101b onto the receiving line C_Rx, the ACK slot 503 becomes a receive level of logic 1 that indicates a NACK (S426).

After the transmitting unit 101b drives the receiving line C_Rx, at the time of the ACK slot 503 of the BRI frame being received, to a NACK signal indicating a negative acknowledgment for that frame as described before, the bus adapter 100 enters the on-training mode M12 again.

On the other hand, if the CAN controller 20, which is in on-training mode M02 after transmitting the BRI frame, detects, from the receiving line C_Rx, a value of the ACK slot for the BRI frame just transmitted by itself that indicates 'successful reception' (S321), it completes the transmission of the BRI frame by driving the transmission line C_Tx to recessive level of a logic 1 by a certain number of bits (ACK delimiter, frame end pattern (EOF), etc.) right after the ACK slot. Then, it enters the normal operation mode M03. The transmission/receiving operations of frames in this normal operation mode M03 are conducted exactly the same as in the conventional CAN controller. This will be briefly described later.

If the CAN controller 20 fails to detect, at the ACK slot, a value of the dominant level indicating successful reception in the on-training mode M02 from the receiving line C_Rx (S322), it checks how many times the BRI frame has been transmitted so far (S323).

If the current transmission count is less than or equal to a predetermined limit value, the CAN controller 20 reconstructs the BRI frame on the basis of the two rules described hereinbefore and transmits it through the transmission line C_Tx as described above (S324). In a preferred embodiment according to the present invention, the BRI frame to be transmitted again is configured to be partially different in bit pattern of the previously transmitted BRI frame.

After the reconstructed BRI frame is transmitted to the bus adapter 100 through the transmission line C_Tx, the CAN controller 20 enters the on-training mode M02 again.

If the current transmission count is greater than the limit value, the CAN controller 20 stops transmitting more BRI frames and enters the mediating failure mode M04. The CAN controller 20 may generate a special alarm signal in case of the mediating failure mode M04. For example, a sound of a specific frequency may be generated or an LED of a specific color may be turned on.

In the above-described embodiments of the present invention, on the premise that the CAN controller 20 transmits data only at a predetermined speed, the bus adapter 100 identifies transmission speed of the connected CAN controller 20 from the BRI frame transmitted therefrom. However, in another embodiment according to the present invention, the bus adapter 100 can identify each bit rate applied to the bit stream in a frame even in case that a CM for transmitting a frame having a variable bit rate is connected. Hereinafter, a description will be given of such an embodiment. For this description, it is assumed that the CAN controller 20, which is a CM connected to the bus adapter 100, supports data transceiving in compliance with CAN-FD protocol, a specific example that defines transmission of a bit stream having different bit rates in a single frame. To be sure, the CAN interface 101 included in the bus adapter 100 also performs data transmission and receiving in compliance with the CAN-FD protocol on the basis of that assumption.

Hereinafter, a detailed description will be given of a method in which the bus adapter 100 identifies dual or a plurality of more transmission rates (referred to as 'multiple rates' or 'multiple bit rates', hereinbelow) of the CAN controller 20 capable of transmitting a frame whose bit rate changes in middle of its bit stream. In this description, only portions that differ from the above-described embodiment are described. In other words, operations not described below, for example, the operations in each mode performed by the bus adapter 100 and the CAN controller 20 according to the state diagrams illustrated in FIGS. 3 and 4, and the operation of feeding back the digital signals being received from the CAN controller 20 to the CAN controller 20 are applied as they are.

Figure 6:
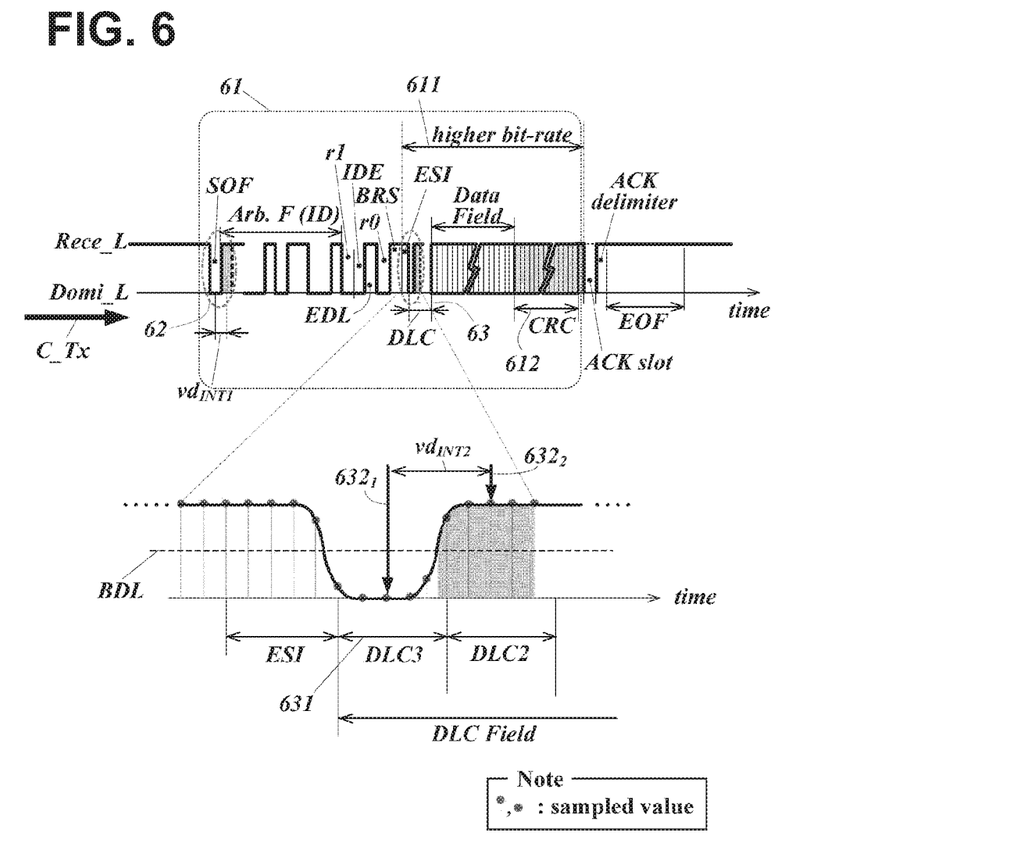
FIG. 6 is a diagram illustrating a process in which the bus adapter of FIG. 2 finds out the dual transmission speeds of a low speed and a high speed to be used by a connected communication module from a frame transmitted by the communication module, according to an embodiment of the present invention.

In the present embodiment in which the multiple rates are respectively identified from a frame where the bit rate is varied in the middle, the CAN controller 20 constructs a BRI frame 61 as illustrated in FIG. 6 and then transmits it to the bus adapter 100 through the transmission line C_Tx.

The BRI frame 61 illustrated in FIG. 6 that is constructed by the CAN controller 20 includes a section of bit string 611 (which is called "High Bit-Rate Section (HBRS)", and another section except for the HBRS 611 is called "Low Bit-Rate Section (LBRS)", hereinbelow) formed at a bit rate faster than another bit rate at which a bit string of the head part is formed. In addition, the BRI bits 62 and 63, which are respectively pulse-shaped signals, are inserted in the LBRS and the HBRS 611, respectively, to form the BRI frame.

The BRI bit 62 for the LBRS is inserted in arbitrary position (preferably, as frame start bit SOF as illustrated) determined for the section in the same manner as in the embodiment described above with reference to FIG. 5. In case of the HBRS 611, the BRI bit 63 is inserted at the head of the data length code field DLC carrying a value indicating the size of the data field. Of course, if the position is previously agreed with the bus adapter 100, that BRI bit may be inserted at any other position from the start point of the HBRS.

As explained above, the BRI bit must change in the signal level right before and after it. Thus, in case that the CAN controller 20 drives the transmission line C_Tx with a value of a recessive level indicating 'error passive' for the error status indicator ESI, which is a start bit from which the bit rate changes to a high speed, it drives the transmission line C_Tx with dominant level and recessive level values respectively for DLC3 and DLC2, which are the first two bits of the data length code field DLC. As a result, the bit of the DLC3 become the BRI bit. If the data length code field, especially the fields of DLC3 and DLC2, are filled as explained before in order to use the most significant bit of the data length code field DLC as the BRI bit 631, the data held of the corresponding BRI frame is configured to have a length of the value filled in the data length code field DLC.

If the BRI frame 61 of multiple bit rates configured as shown in FIG. 6 is received through the transmission line C_Tx, the receiving unit 101a of the bus adapter 100 first identifies the bit rate measures the minimum bit width) of the LBRS from the BRI bit 62 in the LBRS in the same manner as described above, and checks a bit value of the bit rate switch field BRS while obtaining the bits from the sample values by taking one by one every BAI $vd_{INT1}$ corresponding to the identified bit rate. If the field BRS carries a value (logical 0 corresponding to the dominant level) that does not indicate bit rate switching, the receiving unit 101a builds the BRI frame from the obtained bits, without identifying an additional bit rate, and then checks based on the CRC sequence whether or not there is an error in the built frame, as explained above. According to a result of checking whether there is an error, the receiving line C_Rx is driven with a response of ACK or NACK by the transmitting unit 101b so that the CAN controller 20 detects the response.

As illustrated in FIG. 6, if the bit rate switch field BRS in the bit stream being obtained carries a value (logic 1 corresponding to recessive level) indicating bit rate switching, the receiving unit 101a additionally identifies the changed bit rate from the BRI bit 63 at the specified location from the start position (i.e., start point of the error state indicator ESI) of the HBRS 611 being carried at the faster bit rate. This additional bit rate identification is basically the same as the bit rate identification from the preceding BRI bit 62.

While skipping, starting from the sampled value $632_1$ corresponding to the center (if two centers exist, any one of them) of the sampled values belonging to the width 631 of the pre-designated BRI bit 63 (which is an interval from a position where a sampled value regarded firstly as the dominant level to another position where a sampled value regarded as the recessive level based on a predetermined level BDL) in the HBRS 611 of the BRI frame, by the BAI $vd_{INT2}$ corresponding to the number of sampled values regarded to pertain to the BRI bit 631, the sampled values are taken one by one ($632_i$, i=2, 3, . . . ) every BAI to obtain bit sequence for the HBRS 611 in the frame with multiple rates.

When one BRI frame is built by combining both bit streams taken from the LBRS and the HBRS in the manner described above, the receiving unit 101a checks the bit pattern of the CRC sequence 612 included in the built frame in order to determine whether or not there is an error in the built frame. If there is an error, the logic 1 corresponding to the NACK signal is finally applied to the receiving line C_Rx through the transmitting unit 101b by inputting the response signal (ak) of logic 1 to the AND gate A1. If the built frame is normal with no error, a logic 0 corresponding to the ACK signal is transmitted to the receiving line C_Rx through the transmitting unit 101b by applying a response signal (ak) of logic 0 to the AND gate A1.

When it is confirmed that the frame is received with no error, since it means that all the multiple bit rates being used by the connected CM are correctly identified, the receiving unit 101a notifies the transmitting unit 101b of values respectively indicating multiple bit rates (p10) to be set therein. After such setting of multiple bit rates, the transmitting unit 101b will use, if necessary, the set multiple bit rates individually in order for a frame to be transferred to the CAN controller 20 to be transmitted through the receiving line C_Rx in form of a bit sequence constituting a complete frame (e.g., a frame configured in compliance with CAN-FD) to which multiple bit rates are applied. Even if the multiple bit rates are set, the transmitting unit 101b may transmit the bit stream to the connected CM, that is, the CAN controller 20, in form of a frame consisting of only LBRS.

In the above-described embodiment, the head bit of the data length code field DLC in the BRI frame, which is configured by the CAN controller 20 to be used for identifying multiple bit rates, is adopted as the BRI bit for the HBRS. In another embodiment according to the present invention, the bit at which the HBRS starts, that is, the error status indicator field ESI may be used as the BRI bit 71 as illustrated in FIG. 7.

Figure 7:
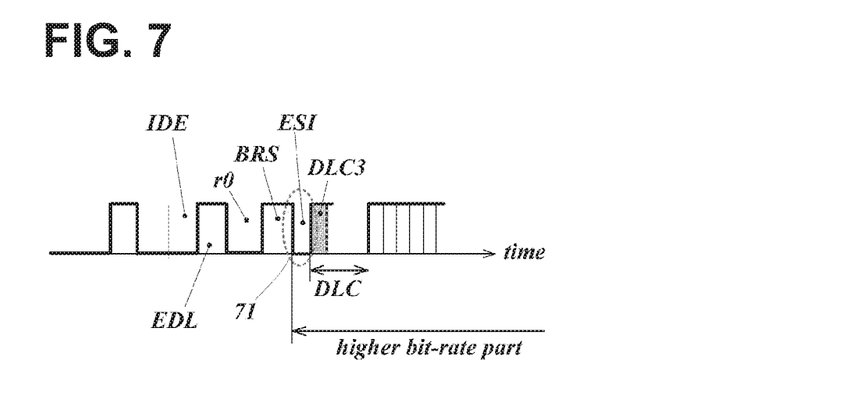
FIG. 7 illustrates that a section of one bit, which makes it possible to find out high speed in case of dual transmission speeds, is prepared at a location where a high bit rate starts in a corresponding frame according to another embodiment of the present invention.

In the embodiment illustrated in FIG. 7, when the CAN controller 20 constructs a BRI frame after power-up or in on-training mode M02, it intentionally drives the transmission line C_Tx to the dominant level (corresponding to logical 0) indicating 'error active' with respect to an error state indicator field ESI. Subsequently, it drives the transmission line C_Tx with recessive level for the first bit DLC3 of the data length code field DLC to cause the error state indicator field ESI to be used as the BRI bit 71.

Even if a frame with the error status indicator field ESI indicating 'error active' is received, the receiving unit 101a of the bus adapter 100, in the on-training mode M12, ignores the value of the error status indicator field ESI included in the received frame and uses the corresponding frame only for identifying multiple bit rates of the connected CM.

In various embodiments of the present invention described so far, when constructing a BRI frame to be used for identifying the data transmission/reception speed of a connected CM, the BRI bit to be inserted for identification of bit-rate (or multiple bit rates) is configured as one bit. However, the principle and the technical idea of the present invention are not limited to having only one bit width for a signal interval to be used for identifying the bit rate(s) of the connected CM.

Figure 8:
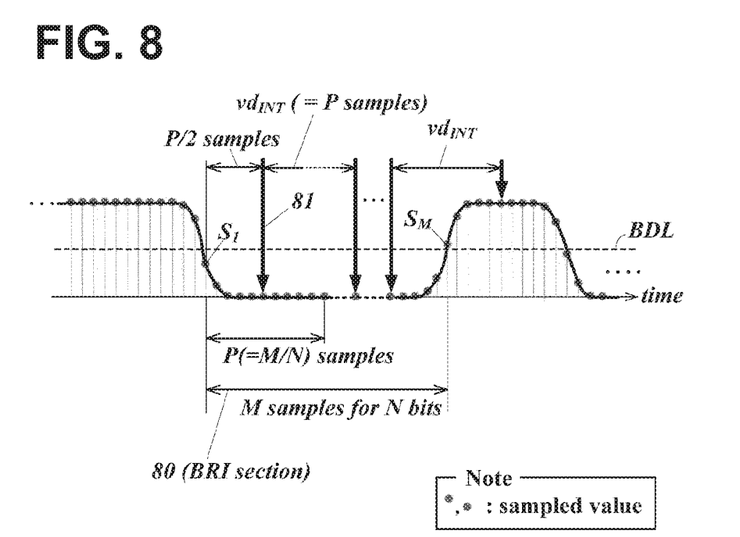
FIG. 8 is a diagram illustrating a method of finding out a transmission speed of a connected communication module through sampling for a section, which is prepared more than 2 bits in a frame in order for the data transmission speed of the communication module is to be identified, according to another embodiment of the present invention.

That is, in other embodiments according to the present invention, as illustrated in FIG. 8, the bit rate(s) may be identified by inserting a negative or positive pulse width 80 (which is referred to as a 'BRI interval') having a length of 2 bits or more in the BRI frame. This BRI interval 80 can be, as in the above-described embodiment, inserted at any position (preferably at the start location) determined from the start point of the frame, or at any position (preferably at the start point of HBRS) determined from the start point of the HBRS.

When the connected CM, namely, the CAN controller 20 transmits a BRI frame including the BRI interval 80 configured as illustrated in FIG. 8 through the transmission line C_Tx, the receiving unit 101a of the bus adapter 100 counts the sampled values (which are sample values from the sample value $S_1$ lower than the set reference level BDL to the sample value $S_M$ higher than the level BDL as shown in the illustrated example) deemed to belong to the corresponding BRI interval, and then obtains the number of samples (P=M/N) corresponding to the minimum bit width $vd_{INT}$ by dividing the number (M) of the counted sample values by the number of bits (N) designated as the corresponding the BRI interval. Finally, it finds out the minimum bit width $vd_{INT}$ from the obtained sample number (P), thereby identifying the bit rate (or bit rate of the HBRS) accordingly.

Afterwards, while skipping, starting from the sampled value 81, which is separated from the first sample value $S_1$ by half of the number of samples (P) belonging to the minimum bit width, by the number of samples (P), the sampled values are taken one by one every BAI (i.e., the minimum bit width) to obtain bit sequence of the frame (or bit sequences pertaining to LBRS and HBRS, respectively).

According to one or more of the various embodiments described above, the bus adapter 100, more specifically, the CAN interface 101 successfully identifies the data transmission/reception speed, namely bit rate (or multiple bit rates) of the connected CM, i.e., the CAN controller 20, and both of the bus adapter 100 and the CAN controller 20 enter the normal operation modes M13 and M03, respectively, to conduct the operations in the corresponding mode. That is, the bus adapter 100 performs the operations necessary for adapting the data frame transceived by the CAN controller 20 to a high speed bus, which serves a higher speed, as follows.

When various types of sensors or devices, which are directly connected to the CAN controller 20, individually provide the CAN controller 20 with data to be transmitted to another node, the CAN controller 20 configures the provided data into a frame in compliance with CAN or CAN-FD protocol. After a bit pattern of consecutive 7-bits of logical 1, which is defined as 'frame end', is detected from the receiving line C_Rx, the CAN controller 20 drives the transmission fine C_Tx sequentially depending on the bit values of the configured frame in order to transmit the frame to the bus adapter 100.

Accordingly, the receiving unit 101a of the bus adapter 100 obtains a bit stream being carried on the transmission line C_Tx from the frame start bit, which is logical 0, in accordance with the bit rate previously identified and set, and temporarily stores the obtained bit stream. At the same time, the data bits are fed back to the transmitting unit 101b (fb). In this receiving process, if there is no CRC error in the frame built by those obtained bit stream, the receiving unit 101a applies, to the AND gate A1 (ak), an ACK signal, namely, logic 0 indicating 'successful reception' at a time point of an ACK slot prepared in the bit stream corresponding to one frame. The ACK signal applied to the AND gate A1 is finally inputted to the transmitting unit 101b. The transmitting unit 101b transfers the bits provided (fib) from the receiving unit 101a to the receiving line C_Rx as they are.

On the other hand, while the CAN controller 20 transmits the bits constituting a frame through the transmission line C_Tx, the bit pattern corresponding to the unique ID transmitted by the CAN controller 20 is applied to the CAN controller 20 itself as it is due to the aforementioned copy onto the receiving line C_Rx. Accordingly, the CAN controller 20 continues to transmit the data bits corresponding to the CAN frame following the unique ID after acknowledging that the bits on the receiving line C_Rx corresponding to the arbitration field are all identical to the bits transmitted by itself. By the operation of the receiving unit 101a described above, the CAN controller 20 confirms that the value of the ACK slot indicates 'successful reception' with respect to the frame transmitted by the CAN controller 20. As a result, the transmission of the CAN frame is completed. That is, after the ACK slot, the transmission line C_Tx is driven to the recessive level by a predetermined number of bits (ACK delimiter, frame end pattern (EOF), etc.).

During this time, the receiving unit 101a receives all the bits corresponding to the frame configured in compliance with CAN or CAN-FD protocol (Whatever protocol is applied to configuration of the frame, this frame is simply called 'CAN frame', hereinafter.) (S431). When the bits being temporarily stored during the bit reception constitute one complete CAN frame, the CAN frame is stored in the outward buffer 102 (S432). Preferably, the CAN frame except the frame start bit, the bits of the ACK field (ACK slot and delimiter) and the frame end bits may be stored in the outward buffer 102.

The link controller 110 retrieves the CAN frames stored in the outward buffer 102 in the order in which they were stored, incorporates each of the read CAN frames into the link format in compliance with CP of the high-speed bus, and transmits the reformatted frame to other nodes through the physically connected bus (S432). The link format to be used at this time may have a form in which a header 702 necessary for inter-link transmission on the high-speed bus is placed before the CAN frame retrieved from the outward buffer 102. Depending on the CP adopted for the high-speed bus, an additional field may be added to the rear end of the CAN frame to be transmitted.

The link controller 110 deletes a corresponding CAN frame in the outward buffer 102 when it is confirmed that the link frame transmitted by itself has been received by other nodes.

In addition, if a link frame of a predetermined format, which is defined for transceiving frame through the high-speed bus 30, is obtained (S441) while detecting signals being carried on the connected high-speed bus 30, the link controller 110 extracts a CAN frame from the obtained link frame, and then stores the extracted CAN frame in the inward buffer 103 (S442).

If the extracted CAN frame does not include a frame start bit and a frame end pattern and the like, the link controller 110 may store the extracted CAN frame in the inward buffer 103 after adding a frame start bit, a frame end pattern and the like before and after the CAN frame, respectively. Of course, such a bit adding operation may be conducted by the transmitting unit 101b instead of the link controller 110.

When at least one CAN frame is stored in the inward buffer 103, the transmitting unit 101b reads data of the corresponding frame in the order in which the frames were stored, and transmits the read data in form of bit sequence through the receiving line C_Rx at the previously-set bit rate (or multiple bit rates) that was notified (p10) by the receiving unit 101a. If the stored CAN frame does not include the frame start bit and the frame end pattern etc., bits corresponding to them are added before and after the frame to be transmitted prior to transmitting the frame.

When the transmission of bits via the receiving line C_RX is started, the transmitting unit 101b notifies the fact of transmission to the receiving unit 101a immediately (p11). This notification causes the receiving unit 101a to ignore the dominant level of the ACK slot generated on the transmission line C_Tx in response to the reception of the frame by the CAN controller 20, so that it is not recognized as transmission start of a new frame.

Figure 9:
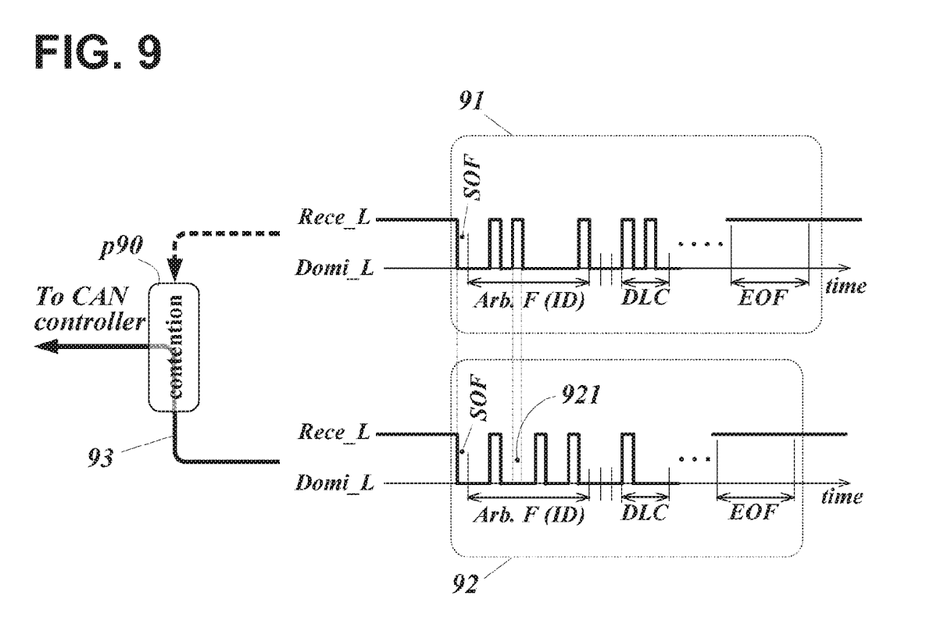
FIG. 9 schematically illustrates a processing method for a case where the start of transmission of a frame received from a shared bus, which nodes are connected to, to a connected communication module and the start of data receiving from the communication module collide with each other, according to an embodiment of the present invention.

If the bits are fed back from the receiving unit 101a simultaneously when the transmitting unit 101b starts to transmit data of the CAN frame stored in the inward buffer 103, the bits being fed back from the receiving unit 101a are not directly copied onto to the receiving line C_Rx. Instead, each bit of the CAN frame 92 to deliver to the CAN controller 20 is transmitted while competing with each bit fed back from the receiving unit 101a (p90), as illustrated in FIG. 9.

More specifically, either of the bit stream 92 of a single bit rate (or multiple bit rates varying in the middle) to transmit to the CAN controller 20 and the bit stream 91 (more specifically, the bit string of the ID of the arbitration field Arb_F) being fed back from the receiving unit 101a is outputted onto the receiving line C_Rx on a bit-by-bit basis until their bits are equal to each other. And, when only one bit steam becomes a value of the dominant level first, its bits are transmitted to the end of the frame and the other bit stream is ignored. That is, as illustrated in the figure, if a logic 0 appears first (921) in the bit string pertaining to the arbitration field of a CAN frame being delivered by the transmitting unit 101b, the data bits are read from the inward buffer 103 to the end of the frame and transmitted through the receiving line C_Rx (93) at the previously-set bit rate (or multiple rates). The data of the transmitted frame is removed from the inward buffer 103. If a logic 0 appears in the bit stream pertaining to the arbitration field fed back from the receiving unit 101a first, the transmitting unit 101b successively copies the bits being fed back onto the receiving line C_Rx, and stops reading data from the inward buffer 103. The data of the frame whose reading is stopped is preserved in the inward buffer 103 as it is.

As described above, the CMs, each of which is indirectly connected to the high-speed bus 30 via the bus adapter 100 configured for initially identifying the data transmission rate of a connected CM and transceiving data with it at the identified bit rate, can use a higher speed bus than the conventional bus intended for their use for communication with each other, without errors in transceiving data with the means for mediating the connection to the bus. That is, the CMs connected indirectly to the high speed bus through the bus adapter 100, respectively, can transmit data faster at an earlier time.

Unless the various embodiments, for the methods of identifying transmission speed of a connected CM in order to mediate the connection of the CM to the a bus, described so far are incompatible with each other, the explained embodiments can be properly chosen in various ways and then combined to embody the concept and idea of the present invention.

The embodiments of the present invention described above have been introduced for the purpose of illustration; therefore, it should be understood by those skilled in the art that modification, change, substitution, or addition to the embodiments is possible without departing from the technical principles and scope of the present invention defined by the appended claims.

What is claimed is:

1. A device for mediating a Communication Module (CM) intended for communication based on a first Communication Protocol (CP) in order for the CM to use a bus through which data is communicated based on a second CP other than the first CP, the device comprising:
    an interface unit configured to be connected to the CM via a first signal line and a second signal line that are separated from each other, and to receive and transmit bit signals through the first and second signal lines, respectively;
    a first buffer configured to store data of a frame of an particular format constituted by a bit stream received from the CM by the interface unit via the first signal line, the particular format being defined by the first CP; and
    a link control unit configured to be connected to the bus, to incorporate data stored in the first buffer into a frame of an arbitrary format defined by the second CP, to transmit the frame of the arbitrary format through the bus, and to store data, which pertains to a frame of the arbitrary format detected from signals carried on the bus, in a second buffer,
    wherein the interface unit is further configured to transmit data stored in the second buffer in form of a frame of the particular format to the CM via the second signal line, to measure a width of a pulse signal that should be inserted at front of or before a first frame of the particular format being received first from the CM via the first signal line, the pulse signal having a leading edge and a trailing edge, to identify a bit rate at which the CM transceives data, by using the measured width as width a predetermined number of bits with respect to signals corresponding to the first frame, and to apply the identified bit rate to data communication with the CM.

2. The device of claim 1, wherein the predetermined number of bits is one bit in the first frame.

3. The device of claim 2,
wherein the interface unit is further configured to additionally identify a second bit rate, which the CM uses in transceiving data, based on a width measured for a second pulse signal inserted, after the pulse signal, at a predetermined position in the first frame, and to apply the identified second bit rate to data communication with the CM too, and
wherein the second pulse signal has a narrower interval than the pulse signal in the first frame.

4. The device of claim 3, wherein the second pulse signal is prepared at a position where a section of which bit rate changes in the first frame starts, or at another position where a field including information on length of data carried in the first frame starts.

5. The device of claim 1,
wherein the interface unit is further configured to additionally identify a second bit rate, which the CM uses in transceiving data, based on a width measured for a second pulse signal inserted, after the pulse signal, at a predetermined position in the first frame, and to apply the identified second bit rate to data communication with the CM too, and
wherein the second pulse signal has a narrower interval than the pulse signal on the first frame.

6. The device of claim 5, wherein the second pulse signal is prepared at a position where a section of which bit rate changes in the first frame starts, or at another position where a field including information on length of data carried in the first frame starts.

7. The device of claim 1, wherein the interface unit is further configured to obtain a bit sequence from signals corresponding to the first frame based on the identified bit rate, to determine whether or not there is a reception error, based on a value of a CRC sequence included in a frame constituted by the obtained bit sequence, and to apply the identified bit rate to data communication with the CM module only when it is confirmed that there is no reception error.

8. The device of claim 7, wherein the interface unit is further configured to drive the second signal line so that a bit stream, which is being received via the first signal line, appears in the second signal line, and to drive the second signal line so that a value, which indicates a result of the determination as to whether or not there is a reception error, appears in an interval of response signal determined for the first frame by the particular format.

9. The device of claim 1, wherein the predetermined number of bits are two or more bits in the first frame.

10. The device of claim 1, wherein the first CP is CAN (Controller Area Network) or CAN-FD (CAN with Flexible Data) protocol.

11. A method for mediating a connection of a Communication Module (CM) intended for communication based on a first Communication Protocol (CP) to a bus through which data is communicated based on a second CP other than the first CP, the method comprising:

a first step, conducted by the CM, of constructing a first frame of a particular format, which is defined by the first CP, in such a manner that a pulse signal is inserted at front of or before the first frame to be transmitted first when power is supplied to the CM, and of transmitting the constructed frame preceded by the pulse signal to an adapting device via a first signal line, the pulse signal having a leading edge and a trailing edge;

a second step, conducted by the adapting device, of measuring a width of the pulse signal that should be placed at front of or before the first frame, if the first frame is first received via the first signal line from the CM after power is supplied to the adapting device, and of identifying a bit rate, which the CM transceives data, by using the measured width as width for a predetermined number of bits with respect to signals corresponding to the first frame; and a third step, conducted by the adapting device, of applying the identified bit rate to both obtaining a bit stream of a frame from signals to be transmitted later via the first signal line by the CM and transmitting data of a frame in form of bit stream to the CM via a second signal line.

12. The method of claim 11, wherein the second step further comprises an additional step of obtaining a bit stream, based on the identified bit rate, from signals corresponding to the first frame, and of checking whether or not there is a reception error in a frame constituted by the obtained bit stream, based on a value of a CRC sequence contained in the constituted frame, and wherein the third step is conducted only when a result of the checking indicates that there is no reception error.

13. The method of claim 12,
wherein the additional step further comprises a sub-step of driving the second signal line so that a specific value indicating the result of the checking is transmitted to the CM, and
wherein the method further comprises:
a step, conducted by the CM when the specific value indicates an error in reception, of constructing a second frame of the particular format in such a manner that the pulse signal is placed at front of or before the second frame, and of transmitting the second frame preceded by the pulse signal to the adapting device via the first signal line; and
a step, conducted by the CM when the specific value indicates successful reception, of configuring data, which is generated and transmitted by at least one second device connected to the CM, into a new frame of the particular format, and of transmitting the new frame to the adapting device via the first signal line.

14. The method of claim 13, wherein the second frame is constructed such that at least a part of bit pattern is different from the first frame.

* * * * *